(12) United States Patent
Okumura et al.

(10) Patent No.: US 6,329,445 B1
(45) Date of Patent: Dec. 11, 2001

(54) OCULAR LENS MATERIAL

(75) Inventors: Akiko Okumura; Kazuhiko Nakada; Akinori Okumura, all of Kasugai (JP)

(73) Assignee: Menicon Co., LTD, Aichi (JP)

(*) Notice: Subject to any disclaimer, the term of this patent is extended or adjusted under 35 U.S.C. 154(b) by 0 days.

(21) Appl. No.: 09/515,895

(22) Filed: Feb. 29, 2000

(30) Foreign Application Priority Data

Mar. 2, 1999 (JP) .................................................. 11-054359

(51) Int. Cl.$^7$ .................................................. C08J 3/00
(52) U.S. Cl. .................. 523/106; 523/107; 526/259; 548/259; 548/260; 351/159
(58) Field of Search .................. 351/159; 526/259; 548/259, 260; 523/106, 107

(56) References Cited

U.S. PATENT DOCUMENTS

| | | | |
|---|---|---|---|
| 5,147,902 | * 9/1992 | Ichikawa et al. .................. | 523/106 |
| 5,814,680 | * 9/1998 | Imafuku .................. | 523/106 |
| 5,945,465 | * 8/1999 | Ozark et al. .................. | 523/106 |
| 6,036,891 | * 3/2000 | Liao et al. .................. | 252/588 |
| 6,096,846 | * 8/2000 | Oda et al. .................. | 526/261 |

FOREIGN PATENT DOCUMENTS

| | | |
|---|---|---|
| 0 488 145 A | 6/1992 | (EP) . |
| 0 847 997 A | 6/1998 | (EP) . |
| 0 899 590 A | 3/1999 | (EP) . |
| 2000-119260 | 4/2000 | (JP) . |

* cited by examiner

Primary Examiner—Margaret Medley
Assistant Examiner—Cephia D. Toomer
(74) Attorney, Agent, or Firm—Armstrong, Westerman, Hattori, McLeland, Naughton, LLP

(57) ABSTRACT

An ocular lens material comprising a polymer prepared by polymerizing a component containing a benzotriazole compound (A) represented by the formula (I):

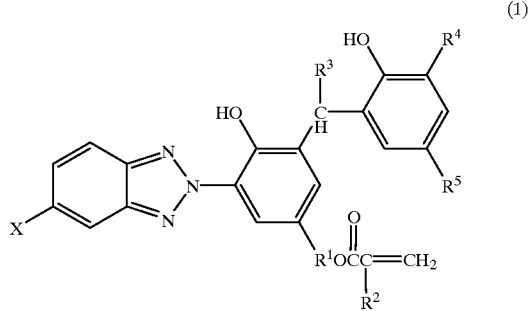

wherein X is hydrogen, a halogen, an alkyl having 1 to 3 carbons or an alkoxy having 1 to 3 carbons, $R^1$ is an alkylene having 2 to 10 carbons, $R^2$ is hydrogen, methyl or a halogenated methyl, $R^3$ is hydrogen, an alkyl or an aryl, and each of $R^4$ and $R^5$ is independently an alkyl having 1 to 8 carbons. The material shows excellent ultraviolet-ray absorbing power and oxidation inhibiting power at the same time.

6 Claims, 3 Drawing Sheets

OCULAR LENS MATERIAL

BACKGROUND OF THE INVENTION

The present invention relates to an ocular lens material. More particularly, the present invention relates to an ocular lens material which has excellent ultraviolet-ray absorbing power and excellent oxidation inhibiting power at the same time, and can be suitably used for a contact lens, an intraocular lens and an artificial cornea.

Conventionally, from the viewpoint of excellent ultraviolet-ray absorbing power, various benzotriazole ultraviolet-ray absorbing agents have been used for medical materials. Among the medical materials, in particular, an ocular lens needs not only ultraviolet-ray absorbing power but also oxidation inhibiting power at many times because there is a fear that color and mark of the ocular lens are decolorized during chemical disinfection by using hydrogen peroxide. However, because most of these benzotriazole ultraviolet-ray absorbing agents have only ultraviolet-ray absorbing power, these agents cannot satisfy the above needs alone.

From the viewpoint of oxidation inhibiting power, a medical material containing an oxidation inhibitor such as a hindered amine derivative has been disclosed in Japanese Examined Patent Publication No. 69489/1994. However, the oxidation inhibitor has no excellent ultraviolet-ray absorbing power. In addition, in consideration of prevention for decolorizing of color and mark of the ocular lens, oxidation inhibiting power of this oxidation inhibitor is insufficient.

As mentioned above, conventionally, considerably useful ocular lens materials made from a compound which has not only excellent ultraviolet-ray absorbing power but also excellent oxidation inhibiting power have not been provided. Accordingly, development of such materials as above has been expected.

An object of the present invention is to provide an ocular lens material which has excellent ultraviolet-ray absorbing power and excellent oxidation inhibiting power at the same time.

This and other objects of the present invention will become apparent from the description hereinafter.

SUMMARY OF THE INVENTION

In accordance with the present invention, there is provided an ocular lens material comprising a polymer prepared by polymerizing a component for polymerization containing a benzotriazole compound (A) represented by the formula (I):

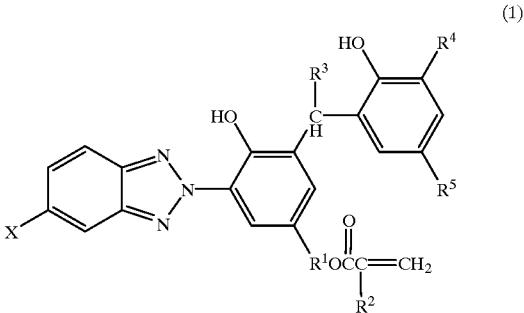

(1)

wherein X is hydrogen atom, a halogen atom, an alkyl group having 1 to 3 carbon atoms or an alkoxy group having 1 to 3 carbon atoms, $R^1$ is a linear or branched alkylene group having 2 to 10 carbon atoms, $R^2$ is hydrogen atom, methyl group or a halogenated methyl group, $R^3$ is hydrogen atom, an alkyl group or an aryl group, and each of $R^4$ and $R^5$ is independently an alkyl group having 1 to 8 carbon atoms.

The ocular lens material of the present invention shows no toxicity owing to elution of a component for polymerization and is, of course, excellent in safety. In addition, the ocular lens material has excellent ultraviolet-ray absorbing power and excellent oxidation inhibiting power at the same time. Accordingly, the ocular lens material can be suitably used for a contact lens, an intraocular lens and an artificial cornea.

DETAILED DESCRIPTION

Figure 1:
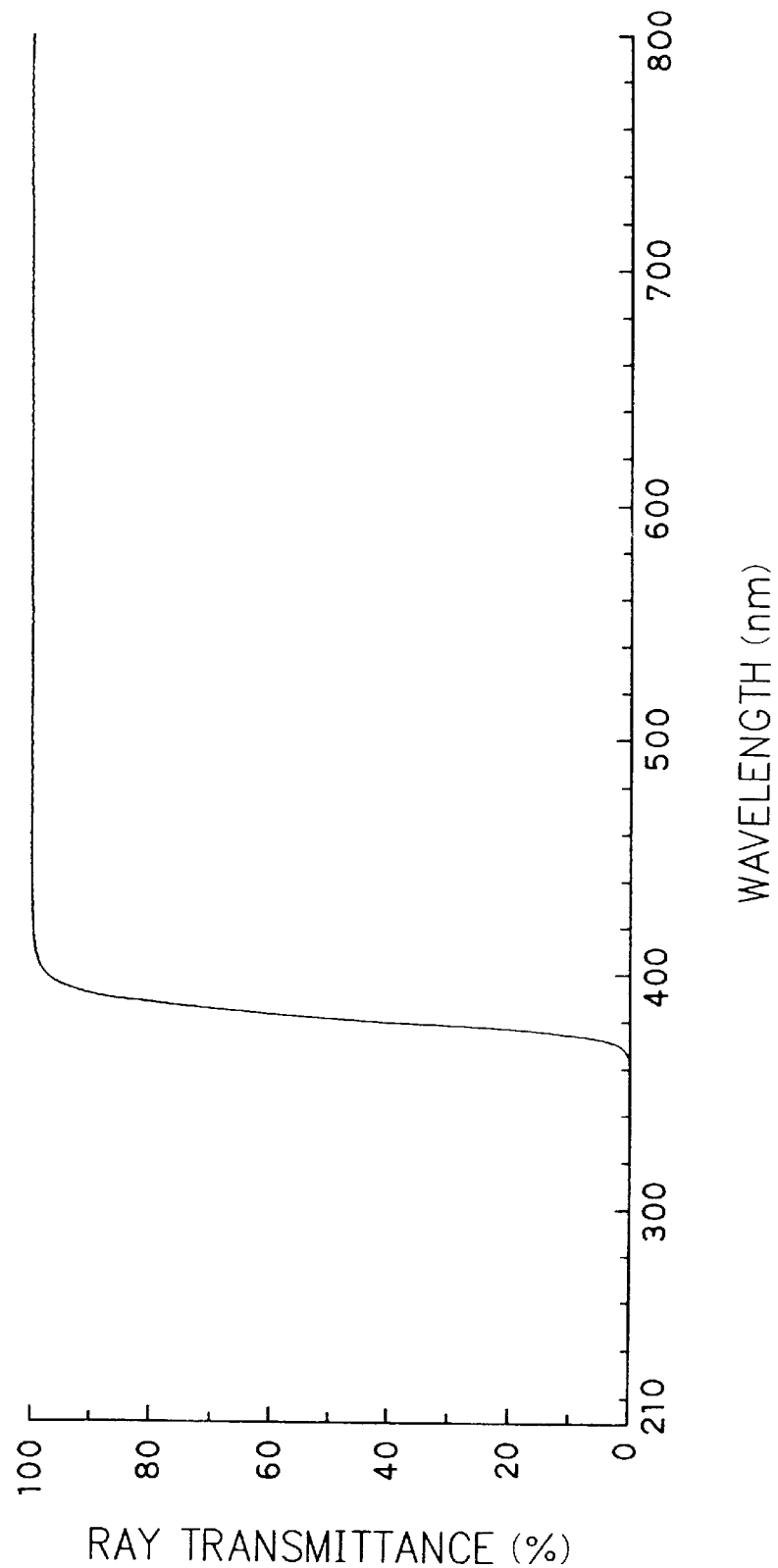
FIG. 1 is a graph showing ray transmittance of the test piece at each wavelength in EXAMPLE 1.

The ocular lens material of the present invention comprises a polymer prepared by polymerizing a component for polymerization containing a benzotriazole compound (A) represented by the formula (I).

The above benzotriazole compound (A) has a skeleton of a benzotriazolyl-alkylenebisphenol ultraviolet-ray absorbing agent in its molecule, and has a polymerizable unsaturated double bond. The benzotriazole compound (A) has not only high ultraviolet-ray absorbing power at near-ultraviolet region such as wavelength of 300 to 380 nm but also excellent oxidation inhibiting power.

In the formula (I) representing the benzotriazole compound (A), examples of the halogen atom represented by X are, for instance, chlorine atom, bromine atom and the like. Examples of the halogenated methyl group represented by $R^2$ are, for instance, chlorinated methyl group, brominated methyl group and the like. The alkyl group represented by $R^3$ is preferably an alkyl group having 1 to 3 carbon atoms. Examples of the aryl group represented by $R^3$ are, for instance, phenyl group, tolyl group, xylyl group, naphthyl group and the like.

Typical examples of the benzotriazole compound (A) are, for instance, compound represented by the formula:

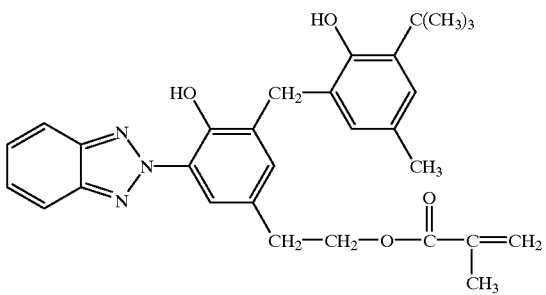

and the like. Because the above compound has particularly excellent ultraviolet-ray absorbing power and oxidation inhibiting power, and can be easily synthesized and is lower cost, the compound is preferably used.

The benzotriazole compound (A) can be synthesized in accordance with, for instance, the following method. In the presence of a basic catalyst and an amine compound, a 2-hydroxy-5-hydroxyalkylphenylbenzotriazole and a 2,4 position-substituted phenol are reacted with an aldehyde and then, the prepared compound is reacted with methacrylic acid to give the benzotriazole compound (A).

In order to sufficiently exhibit ultraviolet-ray absorbing power and oxidation inhibiting power of the benzotriazole compound (A), it is desired that the amount of the benzotriazole compound (A) in the component for polymerization is at least 0.1% by weight, preferably at least 0.3% by weight. In order to remove fears that copolymerizing property of the benzotriazole compound (A) for the following copolymerizable monomer (B) is lowered and that safety is lowered, it is desired that the amount of the benzotriazole compound (A) in the component for polymerization is at most 7% by weight, preferably at most 5% by weight.

The polymer constituting the ocular lens material of the present invention is prepared by polymerizing the component for polymerization containing the benzotriazole compound (A). So long as the objects of the present invention are not inhibited, the monomer (B) copolymerizable with the benzotriazole compound (A) can be used together with the compound (A).

The above monomer (B) is suitably selected in accordance with properties of the aimed ocular lens material and used so that the total amount of the component for polymerization reaches 100% by weight. In consideration that effects of the benzotriazole compound (A) are sufficiently exhibited, it is desired that the amount of the monomer (B) in the component for polymerization is at most 99.9% by weight, preferably at most 99.7% by weight. In consideration that effects of each monomer (B) are sufficiently exhibited, it is desired that the amount of the monomer (B) in the component for polymerization is at least 93% by weight, preferably at least 95% by weight. For instance, in the case that a xerogel ocular lens material is aimed, a hydrophobic monomer is mainly selected. On the other hand, in the case that a hydrogel ocular lens material is aimed, a hydrophilic monomer is mainly selected. In the case that an ocular lens material having excellent mechanical strength is aimed, a reinforcing monomer is mainly selected. In the case that an ocular lens material showing excellent water resistance and solvent resistance is aimed, a crosslinkable monomer for forming crosslinked structures is mainly selected.

For instance, in order to improve oxygen permeability of an ocular lens material, a silicon-containing monomer such as a silicon-containing alkyl (meth)acrylate, a silicon-containing styrene derivative or an alkylvinylsilane is used as the monomer (B).

In the present specification, "-(meth)acrylate" means "-acrylate and/or methacrylate", and the same is also true for the other (meth)acrylate derivatives.

Examples of the above silicon-containing alkyl (meth) acrylate are, for instance, an organopolysiloxane-containing alkyl (meth)acrylate such as pentamethyldisiloxanylmethyl (meth)acrylate, trimethylsiloxydimethylsilylpropyl (meth) acrylate, methylbis(trimethylsiloxy)silylpropyl (meth) acrylate, tris(trimethylsiloxy)silylpropyl (meth)acrylate, mono[methylbis(trimethylsiloxy)siloxy]bis (trimethylsiloxy)silylpropyl (meth)acrylate, tris[methylbis (trimethylsiloxy)siloxy]silylpropyl (meth)acrylate, methyl [bis(trimethylsiloxy)]silylpropylglyceryl (meth)acrylate, tris (trimethylsiloxy)silylpropylglyceryl (meth)acrylate, mono [methylbis(trimethylsiloxy)siloxy]bis(trimethylsiloxy) silylpropylglyceryl (meth)acrylate, trimethylsilylethyltetramethyldisiloxanylpropylglyceryl (meth)acrylate, trimethylsilylmethyl (meth)acrylate, trimethylsilylpropyl (meth)acrylate, trimethylsilylpropylglyceryl (meth)acrylate, pentamethyldisiloxanylpropylglyceryl (meth)acrylate, methylbis(trimethylsiloxy) silylethyltetramethyldisiloxanylmethyl (meth)acrylate, tetramethyltriisopropylcyclotetrasiloxanylpropyl (meth) acrylate, tetramethyltriisopropylcyclotetrasiloxybis (trimethylsiloxy)silylpropyl (meth)acrylate or trimethylsiloxydimethylsilylpropyl (meth)acrylate, and the like.

Examples of the above silicon-containing styrene derivative are, for instance, a silicon-containing styrene derivative represented by the formula (II):

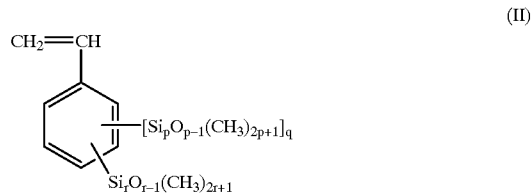

wherein p is an integer of 1 to 15, q is 0 or 1 and r is an integer of 1 to 15, and the like. As to the silicon-containing styrene derivative represented by the formula (II), when p or r is an integer of at least 16, there are tendencies that it is difficult to synthesize and purify the styrene derivative and that hardness of an ocular lens material is lowered. When q is an integer of at least 2, there is a tendency that it is difficult to synthesize the styrene derivative.

Typical examples of the silicon-containing styrene derivative represented by the formula (II) are, for instance, tris (trimethylsiloxy)silylstyrene, bis(trimethylsiloxy) methylsilylstyrene, dimethylsilylstyrene, trimethylsilylstyrene, tris(trimethylsiloxy) siloxanyldimethylsilylstyrene, [bis(trimethylsiloxy) methylsiloxanyl]dimethylsilylstyrene, pentamethyldisiloxanylstyrene, heptamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, trimethylsiloxypentamethyldisiloxymethylsilylstyrene, tris(pentamethyldisiloxy)silylstyrene, (tristrimethylsiloxy)siloxanylbis(trimethylsiloxy)silylstyrene, bis(heptamethyltrisiloxy)methylsilylstyrene, tris(methylbistrimethylsiloxysiloxy)silystyrene, trimethylsiloxybis(tristrimethylsiloxysiloxy)silylstylene, heptakis(trimethylsiloxy)trisiloxanylstyrene, tris(tristrimethylsiloxysiloxy)silylstyrene, (tristrimethylsiloxyhexamethyl)tetrasiloxy(tristrimethylsiloxy)-siloxytrimethylsiloxysilylstyrene, nonakis(trimethylsiloxy)tetrasiloxanylstyrene, bis(tridecamethylhexasiloxy)methylsilylstyrene, heptamethylcyclotetrasiloxanylstyrene, heptamethylcyclotetrasiloxybis(trimethylsiloxy)silylstyrene, tripropyltetramethylcyclotetrasiloxanylstyrene and the like.

Examples of the above alkylvinylsilane are, for instance, trimethylvinylsilane and the like.

Because the silicon-containing monomer is excellent in solubility with the other components for polymerization and exhibits excellent effect for improving oxygen permeability of an ocular lens material, the silicon-containing monomer is particularly preferably used.

The silicon-containing monomer can be used alone or in admixture thereof. The amount of the silicon-containing monomer is suitably adjusted in accordance with properties of the aimed ocular lens material.

In order to improve hydrophilic property of an ocular lens material and to give a hydrogel ocular lens material, a hydrophilic monomer having hydroxyl group, amido group, carboxyl group, amino group, glycol residue, pyrrolidone skeleton and the like is used as the monomer (B).

Examples of the hydrophilic monomer are, for instance, a hydroxyalkyl (meth)acrylate such as 2-hydroxyethyl (meth)acrylate, hydroxybutyl (meth)acrylate or hydroxypropyl (meth)acrylate; an (alkyl)aminoalkyl (meth)acrylate such as 2-dimethylaminoethyl (meth)acrylate or 2-butylaminoethyl (meth)acrylate; an alkyl(meth)acrylamide such as N,N-dimethyl(meth)acrylamide; a polyglycol mono(meth)acrylate such as propylene glycol mono(meth)acrylate; a N-vinyl lactam such as N-vinyl pyrrolidone, N-vinyl piperidone, N-vinyl caprolactam or N-vinyl capryllactam; (meth)acrylic acid; maleic anhydride; fumaric acid; a fumaric acid derivative; aminostyrene; hydroxystyrene; and the like.

Because the hydrophilic monomer is excellent in solubility with the other components for polymerization and exhibits excellent effect for improving hydrophilic property of an ocular lens material, the hydrophilic monomer is particularly preferably used.

The hydrophilic monomer can be used alone or in admixture thereof. The amount of the hydrophilic monomer is suitably adjusted in accordance with properties of the aimed ocular lens material.

In order to improve mechanical strength and durability of an ocular lens material and to impart water resistance and solvent resistance to an ocular lens material, a crosslinkable monomer which is a polyfunctional polymerizable compound having at least two copolymerizable unsaturated double bonds is preferably used as the monomer (B).

Examples of the crosslinkable monomer are, for instance, ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl acrylate, divinylbenzene, diallyl phthalate, diallyl adipate, triallylisocyanurate, α-methylene-N-vinylpyrrolidone, 4-vinylbenzyl (meth)acrylate, 3-vinylbenzyl (meth)acrylate, 2,2-bis(p-(meth)acryloyloxyphenyl)hexafluoropropane, 2,2-bis(m-(meth)acryloyloxyphenyl)hexafluoropropane, 2,2-bis(o-(meth)acryloyloxyphenyl)hexafluoropropane, 2,2-bis(p-(meth)acryloyloxyphenyl)propane, 2,2-bis(m-(meth)acryloyloxyphenyl)propane, 2,2-bis(o-(meth)acryloyloxyphenyl)propane, 1,4-bis(2-(meth)acryloyloxyhexafluoroisopropyl)benzene, 1,3-bis(2-(meth)acryloyloxyhexafluoroisopropyl)benzene, 1,2-bis(2-(meth)acryloyloxyhexafluoroisopropyl)benzene, 1,4-bis(2-(meth)acryloyloxyisopropyl)benzene, 1,3-bis(2-(meth)acryloyloxyisopropyl)benzene, 1,2-bis(2-(meth)acryloyloxyisopropyl)benzene and the like.

Among the crosslinkable monomers, ethylene glycol di(meth)acrylate is particularly preferably used because ethylene glycol di(meth)acrylate is excellent in solubility with the other components for polymerization and exhibits excellent effect for improving mechanical strength of an ocular lens material.

The crosslinkable monomer can be used alone or in admixture thereof. The amount of the crosslinkable monomer is suitably adjusted in accordance with properties of the aimed ocular lens material.

In order to impart deposit resistance to an ocular lens material, a fluorine-containing monomer which is a polymerizable compound of which hydrogen atoms in a hydrocarbon group are partially substituted with fluorine atoms is preferably used as the monomer (B).

Examples of the fluorine-containing monomer are, for instance, a fluoroalkyl (meth)acrylate represented by the formula (III):

$$CH_2=CR^6COOC_sH_{(2s-t-u+1)}F_t(OH)_u \qquad (III)$$

wherein $R^6$ is hydrogen atom or $CH_3$, s is an integer of 1 to 15, t is an integer of 1 to (2s+1) and u is 0 or an integer of 1 to 2, and the like.

Typical examples of the fluoroalkyl (meth)acrylate represented by the formula (III) are, for instance, 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4-hexafluorobutyl(meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2',2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5- nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth)acrylate, 3,3,4,4,5,5,6,6,7,7,8,8,9,9,10,10,11,11,12,12-eicosafluorododecyl (meth)acrylate, 2-hydroxy-4,4,5,5,6,7,7,7-octafluoro-6-trifluoromethylheptyl (meth)acrylate, 2-hydroxy-4,4,5,5,6,6,7,7,8,9,9,9-dodecafluoro-8-trifluoromethylnonyl (meth)acrylate, 2-hydroxy-4,4,5,5,6,6,7,7,8,8,9,9,1011,11,11-hexadecafluoro-10-trifluoromethylundecyl (meth)acrylate and the like.

Among the fluorine-containing monomers, 2,2,2-trifluoroethyl (meth)acrylate is particularly preferably used because 2,2,2-trifluoroethyl (meth)acrylate exhibits excellent effect for improving deposit resistance of an ocular lens material.

The fluorine-containing monomer can be used alone or in admixture thereof. The amount of the fluorine-containing monomer is suitably adjusted in accordance with properties of the aimed ocular lens material.

In order to adjust hardness of an ocular lens material and to give a hard ocular lens material or a soft ocular lens material, a reinforcing monomer such as a polymerizable compound having an alkyl group, such as an alkyl (meth)acrylate or an alkylstyrene, or styrene is used as the monomer (B).

Examples of the alkyl (meth)acrylate are, for instance, a linear, branched or cyclic alkyl (meth)acrylate such as methyl (meth)acrylate, ethyl (meth)acrylate, isopropyl (meth)acrylate, n-propyl (meth)acrylate, isobutyl (meth)acylate, n-butyl (meth)acrylate, t-butyl (meth)acrylate, n-pentyl (meth)acrylate, t-pentyl (meth)acrylate, hexyl (meth)acrylate, heptyl (meth)acrylate, nonyl (meth)acrylate, 2-ethylhexyl (meth)acrylate, n-octyl (meth)acrylate, n-decyl (meth)acrylate, n-dodecyl (meth)acrylate, stearyl (meth)acrylate, cyclopentyl (meth)acrylate or cyclohexyl (meth)acrylate; an alkoxyalkyl (meth)acrylate such as 2-ethoxyethyl (meth)acrylate, 3-ethoxypropyl (meth)acrylate, 2-methoxyethyl (meth)acrylate or 3-methoxypropyl (meth)acrylate; an alkylthioalkyl (meth)acrylate such as ethylthioethyl (meth)acrylate or methylthioethyl (meth)acrylate; and the like.

Examples of the alkylstyrene are, for instance, α-methylstyrene; an alkylstyrene such as methylstyrene, ethylstyrene, propylstyrene, n-butylstyrene, t-butylstyrene, isobutylstyrene or pentylstyrene; an alkyl-α-methylstyrene such as methy-α-methylstyrene, ethyl-α-methylstyrene, propyl-α-methylstyrene, n-butyl-α-methylstyrene, t-butyl-α-methylstyrene, isobutyl-α-methylstyrene or pentyl-α-methylstyrene; and the like.

Among the reinforcing monomers, when a soft contact lens is aimed, a monomer of which homopolymer has glass transition temperature (hereinafter referred to as "Tg") of at most 40° C. is preferably used. When a hard contact lens is aimed, a monomer of which homopolymer has Tg of more than 40° C. is preferably used. Because solubility and copolymerizability with the other components for polymerization is excellent, the alkyl (meth)acrylate is particularly preferable.

The reinforcing monomer can be used alone or in admixture thereof. The amount of the reinforcing monomer is suitably adjusted in accordance with properties of the aimed ocular lens material.

Although the benzotriazole compound (A) can exhibit excellent ultraviolet-ray absorbing power, in addition to the compound (A), a polymerizable ultraviolet-ray absorbing agent, a polymerizable dyestuff and a polymerizable ultraviolet-ray absorbing dyestuff can be used as the monomer (B).

Concrete examples of the polymerizable ultraviolet-ray absorbing agent are, for instance, a polymerizable benzophenone ultraviolet-ray absorbing agent such as 2-hydroxy-4-(meth)acryloyloxybenzophenone, 2-hydroxy-4-(meth)acryloyloxy-5-t-butylbenzophenone, 2-hydroxy-4-(meth)acryloyloxy-2',4'-dichlorobenzophenone or 2-hydroxy-4-(2'-hydroxy-3'-(meth)acryloyloxypropoxy)benzophenone; a polymerizable benzotriazole ultraviolet-ray absorbing agent such as 2-(2'-hydroxy-5'-(meth)acryloyloxyethylphenyl)-2H-benzotriazole, 2-(2'-hydroxy-5'-(meth)acryloyloxyethylphenyl)-5-chloro-2H-benzotriazole, 2-(2'hydroxy-5'-(meth)acryloyloxypropylphenyl)-2H-benzotriazole or 2-(2'-hydroxy-5'-(meth)acryloyloxypropyl-3'-t-butylphenyl)-5-cloro-2H-benzotriazole; a polymerizable salicylic acid derivative ultraviolet-ray absorbing agent such as phenyl 2-hydroxy-4-methacryloyloxymethylbenzoate; methyl 2-cyano-3-phenyl-3-(3'-(meth)acryloyloxyphenyl)propenate; and the like. These can be used alone or in admixture thereof.

Concrete examples of the polymerizable dyestuff are, for instance, a polymerizable azo dyestuff such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-(α-anthrylazo)-2-hydroxy-3-(meth)acryloyloxynaphthalene, 1-((4'-phenylazo)phenyl)azo)-2-hydroxy-3-(meth)acryloyloxynaphthalene, 1-(2',4'xylylazo)-2-(meth)acryloyloxynaphthalene, 1-(o-tolylazo)-2-(meth)acryloyloxynaphthalene, 2-(m-(meth)acryloylamido-anilino)-4,6-bis(1'-(o-tolylazo)-2'-naphthylamino)-1,3,5-triazine, 2-(m-vinylanilino)-4-(4'-nitrophenylazo)-anilino)-6-chloro-1,3,5-triazine, 2-(1'-(o-tolylazo)-2'-naphthyloxy)-4-(m-vinylanilino)-6-chloro- 1,3,5-triazine, 2-(p-vinylanilino)-4-(1'-(o-tolylazo) -2'-naphthylamino)-6-chloro-1,3,5-toriazine, N-(1'-(o-tolylazo)-2'-naphthyl)-3-vinylphthalic acid monoamide, N-(1'-(o-tolylazo)-2'-naphthyl)-6-vinylphthalic acid monoamide, 4'-(p-sulfophenylazo)-1'-naphthyl mono(3-vinylphthalate), 4'-(p-sulfophenylazo)-1'-naphthyl mono(6-vinylphthalate), 3-(meth)acryloylamido-4-phenylazophenol, 3-(meth)acryloylamido-4-(8'-hydroxy-3',6'-disulfo-1'-naphthylazo)phenol, 3-(meth)acryloylamido-4-(1'-phenylazo-2'-naphthylazo)phenol, 3-(meth)acryloylamido-4-(p-tolylazo)phenol, 2-amino-4-(m-(2'-hydroxy-1'-naphtylazo)anilino)-6-isopropenyl- 1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1'-phenylazo)anilino)-

6-isopropenyl-1,3,5-triazine, 2-amino-4-(N-methyl-p-(4'-hydroxyphenylazo)anilino)-6-isopropenyl-1,3,5-triazine, 2-amino-4-(m-(3'-methyl-1'-phenyl-5'-hydroxy-4'-pyrrazolylazo)anilino)-6-isopropenyl-1,3,5-triazine, 2-amino-4-(N-methyl-p-(3'-methyl-1'-phenyl-5'-hydroxy-4'-pyrrazolylazo)anilino)-6-isopropenyl-1,3,5-triazine, 2-amino-4-(p-phenylazoanilino)-6-isopropenyl-1,3,5-triazine or 4-phenylazo-7-(meth)acryloylamido-1-naphthol; a polymerizable anthraquinone dyestuff such as 1,5-bis((meth)acryloylamino)-9,10-anthraquinone, 1-(4'-vinylbenzoylamido)-9,10-anthraquinone, 4-amino-1-(4'-vinylbenzoylamido)-9,10-anthraquinone, 5-amino-1-(4'-vinylbenzoylamido)-9,10-anthraquinone, 8-amino-1-(4'-vinylbenzoylamido)-9,10-anthraquinone, 4-nitro-1-(4'-vinylbenzoylamido)-9,10-anthraquinone, 4-hydroxy-1-(4'-vinylbenzoylamido)-9,10-anthraquinone, 1-(3'-vinylbenzoylamido)-9,10-anthraquinone, 1-(4'-isopropenylbenzoylamido)-9,10-anthraquinone, 1-(3'isopropenylbenzoylamido)-9,10-anthraquinone, 1-(2'-isopropenylbenzoylamido)-9,10-anthraquinone, 1,4-bis(4'-vinylbenzoylamido)-9,10-anthraquinone, 1,4-bis(4'-isopropenylbenzolyamido)-9,10-anthraquinone, 1,5'-bis(4'-vinylbenzoylamido)-9,10-anthraquinone, 1,5-bis(4'-isopropenylbenzoylamido)-9,10-anthraquinone, 1-methylamino-4-(3'-vinylbenzoylamido)-9,10-anthraquinone, 1-methylamino-4-(4'-vinylbenzoyloxyethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-amino-4-(3'-(meth)acryloylaminophenylamino)-9,10-anthraquinone-2-sulfonic acid, 1-amino-4-(3'-(meth)acryloylaminobenzylamino)-9,10-anthraquinone-2-sulfonic acid, 1-(β-ethoxycarbonylallylamino)-9,10-anthraquinone, 1-(β-carboxyallylamino)-9,10-anthraquinone, 1,5-di-(β-carboxyallylamino)-9,10-anthraquinone, 1,5-di-(β-isopropoxycarbonylallylamino)-5-benzoylamido-9,10-anthraquinone, 2-(3'-(meth)acryloylamido-anilino)-4-(3'-(3"-sulfo-4"-aminoanthraquinone-1"-yl)-amino-anilino)-6-chloro-1,3,5-triazine, 2-(3'-(meth)acryloylamido-anilino)-4-(3'-(3"-sulfo-4"-aminoanthraquinone-1"-yl)-amino-anilino)-6-hydorazino-1,3,5-triazine, 2,4-bis-((4"-methoxyanthraquinone-1"-yl)-amino)-6-(3'-vinylanilino)-1,3,5-triazine or 2-(2'-vinylphenoxy)-4-(4'-(3"-sulfo-4"-aminoanthraquinone-1"-yl-amino)-anilino)-6-chloro-1,3,5-triazine; a polymerizable nitro dyestuff such as o-nitroanilinomethyl (meth)acrylate; a polymerizable phthalocyanine dyestuff such as (meth)acryloyl-modified tetraamino copper phthalocyanine or (meth)acryloyl-modified (dodecanoyl-modified tetraamino copper phthalocyanine); and the like. These can be used alone or in admixture thereof.

Concrete examples of the polymerizable ultraviolet-ray absorbing dyestuff are, for instance, a polymerizable benzophenone ultraviolet-ray absorbing dyestuff such as 2,4-dihydroxy-3-(p-styrenoazo)benzophenone, 2,4-dihydroxy-5-(p-styrenoazo)benzophenone, 2,4-dihydroxy-3-(p-(meth)acryloyloxymethylphenylazo)benzophenone, 2,4-dihydroxy-5-(p-(meth)acryloyloxymethylphenylazo)benzophenone, 2,4-dihydroxy-3-(p-(meth) acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo)benzophenone, 2,4-dihydroxy-5-(p-(meth)acryloyloxypropylphenylazo)benzophenone, 2,4-dihydroxy-3-(o-(meth)acryloyloxymethylphenylazo)benzophenone, 2,4-dihydroxy-5-(o-(meth)acryloyloxymethylphenylazo)benzophenone, 2,4-dihydroxy-3-(o-(meth)acryloyloxymehtylphenylazo)benzophenone, 2,4-dihydroxy-5-(o-(meth)acryloyloxyethylphenylazo)benzophenone, 2,4-dihydroxy-3-(o-(meth)acryloyloxypropylphenylazo)benzophenone, 2,4-dihydroxy-5-(o-(meth)acryloyloxypropylphenylazo)benzophenone, 2,4-dihydroxy-3-(p-(N,N-di(meth)acryloyloxyethylamino)phenylazo)benzophenone, 2,4-dihydroxy-5-(p-(N,N-di(meth)acryloyloxyethylamino)phenylazo)benzophenone, 2,4-dihydroxy-3-(o-(N,N-di(meth)acryloyloxyethylamino)phenylazo)benzophenone, 2,4-dihydroxy-5-(o-(N,N-di(meth)acryloyloxyethylamino)phenylazo)benzophenone, 2,4-dihydroxy-3-(p-(N-ethyl-N-(meth)acryloyloxyethylamino)phenylazo)benzophenone, 2,4-dihydroxy-5-(p-(N-ethyl-N-(meth)acryloyloxyethylamino)phenylazo)benzophenone, 2,4-dihydroxy-3-(o-(N-ethyl-N-(meth)acryloyloxyethylamino)phenylazo)benzophenone, 2,4-dihydroxy-5-(o-(N-ethyl-N-(meth)acryloyloxyethylamino)phenylazo)benzophenone, 2,4-dihydroxy-3-(p-(N-ethyl-N-(meth)acryloylamino)phenylazo)benzophenone, 2,4-dihydroxy-5-(p-(N-ethyl-N-di(meth)acryloylamino)phenylazo)benzophenone, 2,4-dihydroxy-3-(o-(N-ethyl-N-(meth)acryloylamino)phenylazo)benzophenone or 2,4-dihydorxy-5-(o-N-ethyl-N-di(meth)acryloylamino)phenylazo)benzophenone; a polymerizable benzoic acid ultraviolet-ray absorbing dyestuff such as 2-hydroxy-4-(p-styrenoazo)phenyl benzoate; an additive dyestuff such as a vat dyestuff such as Color Index (hereinafter referred to as "C.I.") Vat Blue 2, C.I. Vat Blue 5, C.I. Vat Blue 8, C.I. Vat Black 1, C.I. Vat Black 4, C.I. Vat Black 6, C.I. Vat Yellow 3, C.I. Vat Yellow 4, C.I. Vat Yellow 7, C.I. Vat Yellow 8, C.I. Vat Red 1, C.I. Vat Red 2 or C.I. Vat Red 10, or C.I. Solvent such as C.I. Solvent Yellow 16, C.I. Solvent Yellow 29, C.I. Solvent Yellow 33, C.I. Solvent Yellow 44, C.I. Solvent Yellow 56, C.I. Solvent Yellow 77 or C.I. Solvent Yellow 93. These can be used alone or in admixture thereof.

The amount of the polymerizable ultraviolet-ray absorbing agent, the polymerizable dyestuff and the polymerizable ultraviolet-ray absorbing dyestuff is suitably adjusted in accordance with properties of the aimed ocular lens material. It is desired that the amount is adjusted in consideration of great influence with the thickness of the material. In order to remove fears that physical property such as mechanical strength of an ocular lens material is lowered and that the ocular lens material cannot be suitably used for ocular lenses such as a contact lens which directly contacts with organic tissues and an intraocular lens which is inserted within organism, in consideration of organic conformity of the polymerizable ultraviolet-ray absorbing agent, the polymerizable dyestuff and the polymerizable ultraviolet-ray absorbing dyestuff, it is desired that the amount of these absorbing agent and dyestuffs in the component for polymerization is at most 3% by weight, preferably 0.1 to 2% by weight. This amount is adjusted in consideration of also the amount of the benzotriazole compound (A). In particular, when the amount of the dyestuffs is too large, color of an ocular lens becomes too deep and transparency of the lens is lowered, so that it becomes difficult for the lens to transmit visible-ray. Accordingly, the amount of the dyestuffs is suitably adjusted in consideration of the above fact.

The component for polymerization containing the benzotriazole compound (A) and, as occasion demands, the monomer (B) is suitably adjusted and polymerized in accordance with the use of the aimed ocular lens such as a contact lens, an intraocular lens or an artificial cornea.

In the present invention, the component for polymerization containing the benzotriazole compound (A) and, as occasion demands, the monomer (B) is suitably adjusted to the desired amount within the above range and then, a radical polymerization initiator is added thereto and polymerization is carried out in accordance with a usual method to give a polymer.

The above usual method is, for instance, a method comprising adding the radical polymerization initiator to the component for polymerization and carrying out the polymerization by gradually heating the component within the range of the temperature of room temperature to about 130° C. (thermal polymerization), or by irradiating the component with electromagnetic wave such as microwave, ultraviolet-ray or radial rays (gamma rays). When the thermal polymerization is carried out, the temperature of the component may be increased stepwise. The polymerization may be carried out according to a bulk polymerization method, a solution polymerization method using a solvent, or the other methods.

Typical examples of the radical polymerization initiator are, for instance, azobisisobutyronitrile, azobisdimethylvaleronitrile, benzoyl peroxide, t-butyl hydroperoxide, cumene hydroperoxide and the like. These can be used alone or in admixture thereof. When the polymerization is carried out utilizing electromagnetic wave, it is desired that a photo polymerization initiator and a sensitizer are added to the component for polymerization. It is desired that the total amount of the above polymerization initiator and the sinsitizer is about 0.001 to 2 parts by weight (hereinafter referred to as "part(s)"), preferably about 0.01 to 1 part based on 100 parts of the total amount of the component for polymerization.

In the present invention, as a method for forming the polymer into an ocular lens such as a contact lens, an intraocular lens or an artificial cornea, a forming method which has been usually employed by a person skilled in the art can be employed. Examples of the forming method are, for instance, a cutting process, a molding method and the like. The cutting process is a method comprising carrying out the polymerization in a suitable mold or a suitable container to give a material (polymer) having a shape such as bar, block or plate and subjecting the polymer to a mechanical process such as a cutting process or a polishing process to give a formed article having the desired shape. The molding method is a method comprising polymerizing the above component for polymerization in a mold having a shape corresponding to the desired shape of an ocular lens to give a molded product and, as occasion demands, subjecting the molded product to a mechanically finishing process to give a formed article.

When the ocular lens material of the present invention is produced as a soft material at the temperature near to room temperature, in general, it is desired that the molding method is employed as a method for forming the polymer into an ocular lens. Examples of the molding method are, for instance, a spin casting method, a static casting method and the like.

In addition to the above methods, in the present invention, for instance, there can be suitably employed a method described in Japanese Unexamined Patent Publications No. 2780241/1987 and No. 11854/1989, which comprises impregnating a soft ocular lens material with a monomer which gives a hard polymer, after that polymerizing the monomer to more harden the lens material in whole, subjecting the lens material to a cutting process to give a formed product having the desired shape and removing the hard polymer from the formed product to give a formed article (ocular lens) made of the soft material; and the like.

When an intraocular lens is produced, a lens and haptics may be separately produced, the haptics may be attached to the lens after production, and the lens and the haptics may be formed at the same time (on the whole).

The ocular lens material of the present invention shows no toxicity owing to elution of the component for polymerization, in particular, the benzotriazole compound (A) and is, of course, excellent in safety. In addition, the ocular lens material can sufficiently absorb ultraviolet-ray such as sunlight and can be sufficiently prevented from oxidizing at the same time. Accordingly, even though a color intraocular lens, a color contact lens and a marked contact lens are chemically disinfected in hydrogen peroxide, there is no fear that color and mark decolor.

The ocular lens material of the present invention is more specifically described and explained by mans of the following Examples. It is to be understood that the present invention is not limited to the Examples, and various changes and modifications may be made in the invention without departing from the spirit and scope thereof.

EXAMPLES 1 TO 2 AND COMPARATIVE EXAMPLE 1

A component for polymerization shown in TABLE 1 and as a polymerization initiator, 2,2'-azobis(2,4-dimethylvaleronitrile) in an amount of 0.02 part based on 100 parts of the total amount of the component for polymerization were uniformly mixed with each other to give a transparent solution. The solution was poured into a test tube made of glass, having an inside diameter of 15 mm, and a deoxidizer was added to the solution. The test tube was sealed up.

After the test tube was put into a thermostated circulating water bath and the polymerization was carried out at 35° C. for 40 hours and at 50° C. for 8 hours, the test tube was transferred from the thermostated circulating water bath to a circulating dry oven. The test tube was heated with gradually increasing the temperature of the solution in the test tube from 60° to 120° C. for about 16 hours and the polymerization was completed to give a polymer having a diameter of about 15 mm and a shape like a bar.

The obtained polymer was cut into a piece having the desired thickness. A cutting and polishing process was conducted to the cut piece to give a test piece having a thickness shown in TABLE 1.

Using the above test piece, ultraviolet-ray absorbing power and elution ratio of the ultraviolet-ray absorbing agent were measured.

(1) Ultraviolet-ray Absorbing Power

Using Shimazu automatic recording spectrophotometer made by SHIMAZU CORPORATION (UV-3100), the test piece was irradiated with ray having a wavelength of 190 to 800 nm and ray transmittance of the test piece was measured. The results in EXAMPLE 1, EXAMPLE 2 and COMPARATIVE EXAMPLE 1 were shown in FIG. 1, FIG. 2 and FIG. 3, respectively.

(A)-1: Compound represented by the following formula:

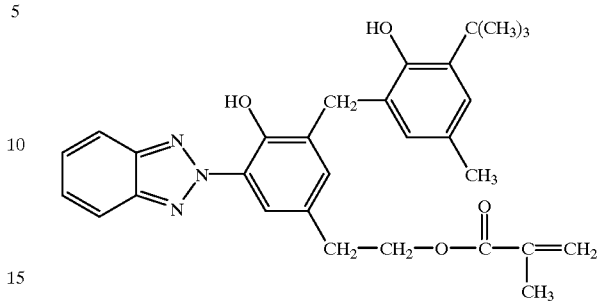

CBDMP: 2-(5-Chloro-2H-benzotriazole-2-yl)-6-(1,1-dimethylethyl)-4-methylphenol

3FEMA: 2,2,2-Trifluoroethyl methacrylate

SK5001: Tris(trimethylsiloxy)silylpropyl methacrylate

MMA: Methyl methacrylate

NVP: N-Vinyl pyrrolidone

EDMA: Ethylene glycol dimethacrylate

TABLE 1

| | Component for polymerization | | | | | | Test piece | |
|---|---|---|---|---|---|---|---|---|
| | Ultraviolet-ray absorbing agent | | | | | | | |
| | (% by weight) | | Monomer (B) (part(s)) | | | | Thickness | Elution ratio |
| Ex. No. | (A)-1 | CBDMP | 3FEEMA | SK5001 | MMA | EDMA | (mm) | (% by weight) |
| 1 | 1 | — | 50 | 50 | — | 3 | 0.2 | 0.5 ≧ |
| 2 | 1 | — | — | — | 99 | 1 | 1.0 | 0.5 ≧ |
| Com. Ex. No. 1 | — | 1 | — | — | 97 | 3 | 1.0 | 80 < |

(2) Elution Ratio of Ultraviolet-ray Absorbing Agent

After the test piece was immersed in ethanol at 25° C. for 72 hours, the test piece was picked up. Then, the eluting ultraviolet-ray absorbing agent in ethanol was extracted. The elution ratio was calculated according to the following equation. In the following equation, "A" denotes absorbance of the ultraviolet-ray absorbing agent in ethanol at 340 nm, and "A'" denotes absorbance of the ultraviolet-ray absorbing agent in ethanol at 340 nm when it assumes that the total amount of the ultraviolet-ray absorbing agent has eluted in ethanol. The results are shown in TABLE 1.

Elution ratio (% by weight)=$(A/A')\times 100$

Each code in TABLE 1 and the following TABLE 2 shows the following compound.

Figure 2:
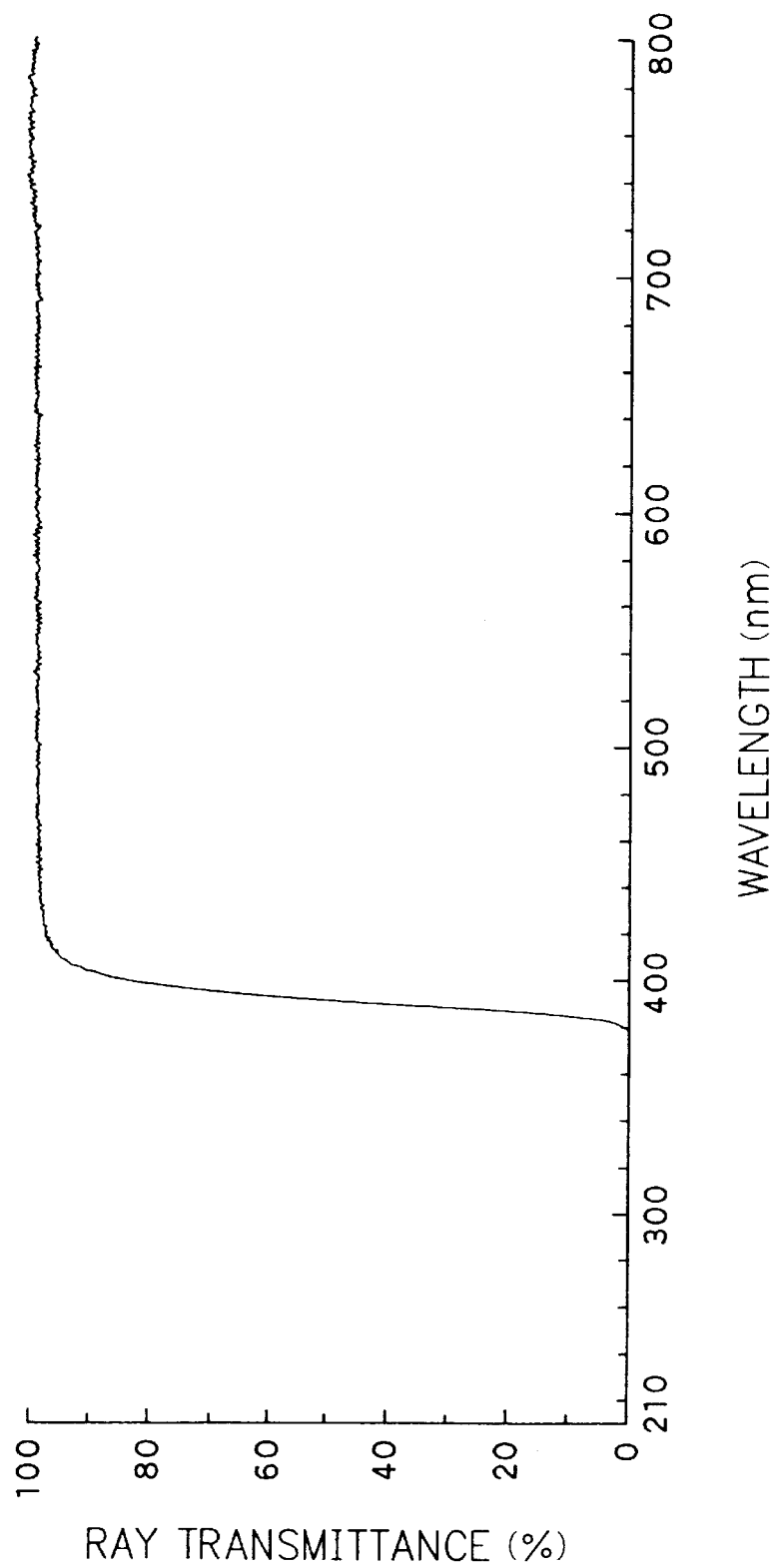
FIG. 2 is a graph showing ray transmittance of the test piece at each wavelength in EXAMPLE 2.
Figure 3:
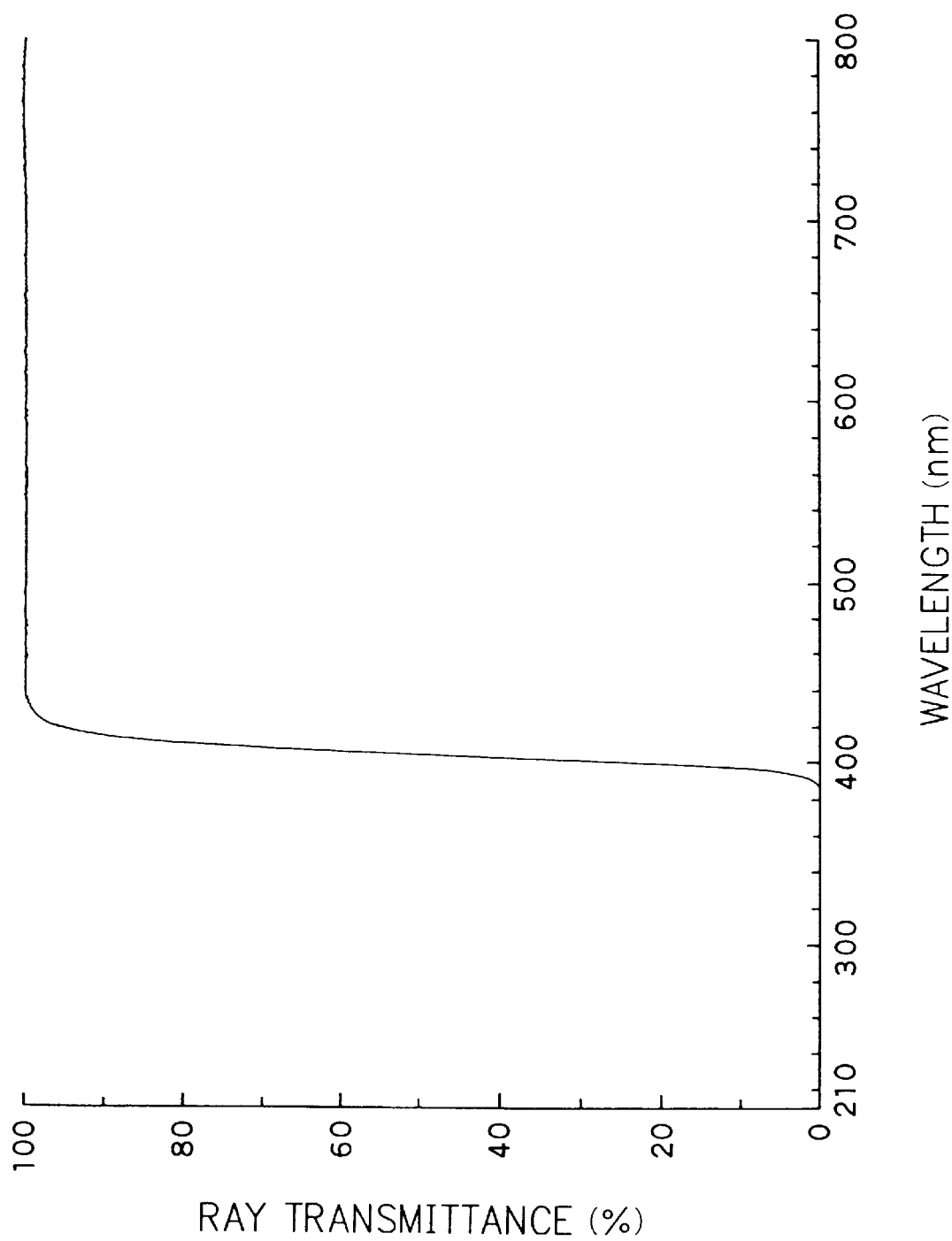
FIG. 3 is a graph showing ray transmittance of the test piece at each wavelength in COMPARATIVE EXAMPLE 1.

As shown in FIGS. 1 to 3, the ocular lens materials (test pieces) of the present invention in EXAMPLES 1 to 2, which were prepared by using the benzotriazole compound (A), can almost absorb ultraviolet-ray having a wavelength of at most 380 nm. Accordingly, it can be seen that the ocular lens materials in EXAMPLES 1 to 2 exhibit the same ultraviolet-ray absorbing power as that of the material (test piece) in COMPARATIVE EXAMPLE 1, which was prepared by using a conventional ultraviolet-ray absorbing agent.

From the results shown in TABLE 1, it can be seen that the benzotriazole compound (A) hardly elutes from the test pieces in EXAMPLES 1 to 2 and the test pieces are excellent in safety. To the contrary, it can be seen that a large amount of the conventional ultraviolet-ray absorbing agent elutes from the test piece in COMPARATIVE EXAMPLE 1.

EXAMPLE 3 AND COMPARATIVE EXAMPLE 2

The same manner as in EXAMPLES 1 to 2 and COMPARATIVE EXAMPLE 1 was repeated except that components shown in TABLE 2 were used as the component for polymerization and 0.05 part of C.I. Vat Blue 2 as a dyestuff was added based on 100 parts of the component for polymerization to give a color test piece having a thickness of 0.2 mm, a diameter of about 15 mm and a water content of 45% by weight.

The above color test piece was immersed in 3% hydrogen peroxide at 35° C. and the color test piece was picked up after 24 hours. The color test piece was observed with naked eyes. Color of the test piece after immersing in hydrogen peroxide was compared with that before immersing and the existence of decolorizing was examined. The results are shown in TABLE 2.

TABLE 2

| Ex. No. | Component for polymerization | | | | Test piece Decolorizing |
|---|---|---|---|---|---|
| | (A)-1 (% by weight) | Monomer (B) (part(s)) | | | |
| | | NVP | MMA | EDMA | |
| 3 | 1 | 50 | 50 | 0.1 | None |
| Com. Ex. No. 2 | — | 50 | 50 | 0.1 | Existence |

From the results shown in TABLE 2, it can be seen that the ocular lens material (test piece) of the present invention in EXAMPLE 3, which was prepared by using the benzotriazole compound (A), does not decolor even though after immersing in hydrogen peroxide, and excellent oxidation inhibiting power of the benzotriazole compound (A) is sufficiently exhibited. To the contrary, it can be seen that the material (test piece) in COMPARATIVE EXAMPLE 2, which was prepared by not using the benzotriazole compound (A), decolors due to oxidation during immersing in hydrogen peroxide.

In addition to the ingredients used in the Examples, other ingredients can be used in the Examples as set forth in the specification to obtain substantially the same results.

What is claimed is:

1. An ocular lens material comprising a polymer prepared by polymerizing a component for polymerization containing a benzotriazole compound (A) represented by the formula (I):

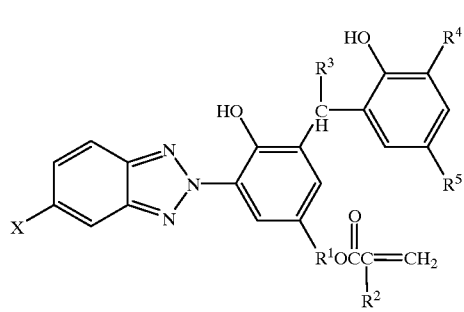

wherein X is hydrogen atom, a halogen atom, an alkyl group having 1 to 3 carbon atoms or an alkoxy group having 1 to 3 carbon atoms, $R^1$ is a linear or branched alkylene group having 2 to 10 carbon atoms, $R^2$ is hydrogen atom, methyl group or a halogenated methyl group, $R^3$ is hydrogen atom, an alkyl group or an aryl group, and each of $R^4$ and $R^5$ is independently an alkyl group having 1 to 8 carbon atoms, and at least one monomer (B) copolymerizable with the benzotriazole compound (A).

2. The ocular lens material of claim 1, wherein the monomer (B) is at least one selected from an alkyl (meth) acrylate, a silicon-containing monomer, a fluorine-containing monomer and a hydrophilic monomer.

3. The ocular lens material of claim 1, wherein the monomer (B) contains at least one crosslinkable monomer.

4. The ocular lens material of claim 1, wherein the amount of the benzotriazole compound (A) in the component for polymerization is 0.1 to 7% by weight.

5. The ocular lens material of claim 1, wherein the benzotriazole compound (A) is a compound represented by the formula:

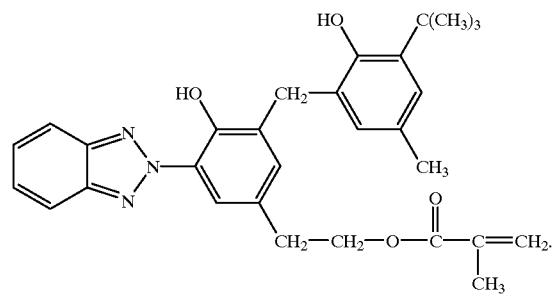

6. A polymerizable benzotriazole compound for an ocular lens material, represented by the formula (I):

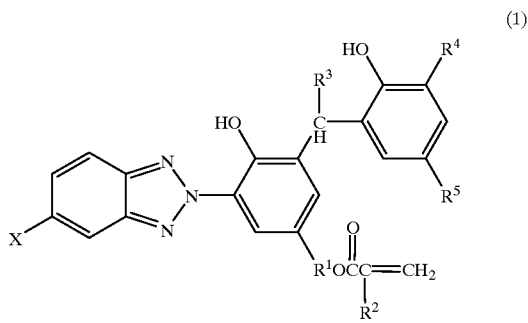

wherein X is hydrogen atom, a halogen atom, an alkyl group having 1 to 3 carbon atoms or an alkoxy group having 1 to 3 carbon atoms, $R^1$ is a linear or branched alkylene group having 2 to 10 carbon atoms, $R^2$ is hydrogen atom, methyl group or a halogenated methyl group, $R^3$ is hydrogen atom, an alkyl group or an aryl group, and each of $R^4$ and $R^5$ is independently an alkyl group having 1 to 8 carbon atoms.

* * * * *